United States Patent
Vaishnavi et al.

(10) Patent No.: US 10,972,898 B2
(45) Date of Patent: Apr. 6, 2021

(54) SYSTEM AND INTERFACE FOR CROSS ADMINISTRATION OR TECHNOLOGY DOMAIN NETWORK FUNCTIONS (NFS) INSTANTIATION AND CONFIGURATION FOR ROAMING USERS

(71) Applicant: HUAWEI TECHNOLOGIES CO., LTD., Guangdong (CN)

(72) Inventors: Ishan Vaishnavi, Munich (DE); Riccardo Trivisonno, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/875,081

(22) Filed: May 15, 2020

(65) Prior Publication Data

US 2020/0280837 A1    Sep. 3, 2020

Related U.S. Application Data

(63) Continuation of application No. PCT/EP2017/079449, filed on Nov. 16, 2017.

(51) Int. Cl.
*H04W 8/12*     (2009.01)
*H04W 8/06*     (2009.01)
(Continued)

(52) U.S. Cl.
CPC ............. *H04W 8/12* (2013.01); *H04W 8/06* (2013.01); *H04W 8/18* (2013.01); *H04W 36/12* (2013.01)

(58) Field of Classification Search
CPC ............ H04W 36/08; H04W 36/0055; H04W 36/0061; H04W 88/08; H04W 36/0033;
(Continued)

(56) References Cited

U.S. PATENT DOCUMENTS

2018/0115933 A1* 4/2018 Radulescu ........ H04W 36/0066

FOREIGN PATENT DOCUMENTS

GB    2542573 A    3/2017
WO    2017113100 A1    7/2017
(Continued)

OTHER PUBLICATIONS

3GPP TS 23.501 V0.3.0 1: 3rd Generation Partnership Project;Technical Specification Group Services and System Aspects;System Architecture for the 5G System;Stage 2(Release 15) Mar. 2017 total 97 pages.
(Continued)

*Primary Examiner* — Kwasi Karikari
(74) *Attorney, Agent, or Firm* — Womble Bond Dickinson (US) LLP

(57) ABSTRACT

An embodiment of the present invention relates to an operator management system in a first administrative domain for supporting a user roaming from the first administrative domain to a second administrative domain within a network architecture. The network architecture comprises a collection of interconnected network functions deployed in a control plane and a user plane, and the interconnected NFs comprise at least core network control plane functions and a core network user plane function. The OMS in the first administrative domain is configured to generate and issue to an OMS in the second administrative domain, a roaming management request for roaming a user from the first administrative domain to the second administrative domain, over an inter-operator management interface, and configured to instruct the OMS in the second administrative domain to configure the second administrative domain based on the roaming management request to support the user roaming.

18 Claims, 11 Drawing Sheets

(51) Int. Cl.
*H04W 8/18* (2009.01)
*H04W 36/12* (2009.01)

(58) Field of Classification Search
CPC ............ H04W 36/0072; H04W 24/10; H04W 36/0005; H04W 36/14; H04W 36/0016; H04W 36/0058; H04W 76/11; H04W 88/02; H04W 36/00; H04W 36/18; H04W 72/048; H04W 36/0011; H04W 36/0077; H04W 36/04; H04W 76/10; H04W 36/0088; H04W 84/045; H04W 8/24; H04W 92/20; H04W 76/15; H04W 8/08; H04W 8/14; H04W 24/02; H04W 36/0022; H04W 36/0094; H04W 72/0406; H04W 72/0453; H04W 28/0289; H04W 36/023; H04W 36/16; H04W 28/10; H04W 36/0085; H04W 36/34; H04W 56/001; H04W 72/0486; H04W 28/08; H04W 28/12; H04W 36/06; H04W 40/36; H04W 48/20; H04W 72/0493
See application file for complete search history.

(56) References Cited

FOREIGN PATENT DOCUMENTS

| WO | 2017140375 A1 | 8/2017 |
| WO | 2017144096 A1 | 8/2017 |

OTHER PUBLICATIONS

SA WG2 Meeting #122bis,S2-176529,NRF Roaming Clarification,T-Mobile USA Inc,Aug. 21-25, 2017~France.total 10 pages.
3GPP TS 23.501 V1.4.0: 3rd Generation Partnership Project;Technical Specification Group Services and System Aspects;System Architecture for the 5G System;Stage 2(Release 15) Sep. 2017 total 151 pages.
ETSI GS NFV-MAN 001 V1.1.1 ,Network Functions Virtualisation (NFV);Management and Orchestration ,Dec. 2014,total 184 pages.
3GPP TS 23.501 V1.2.0: 3rd Generation Partnership Project;Technical Specification Group Services and System Aspects;System Architecture for the 5G System;Stage 2(Release 15) (Jul. 2017 total 8 pages.
3GPP TR 28.801 V15.0.0, 3rd Generation Partnership Project;Technical Specification Group Services and System Aspects;Telecommunication management;Study on management and orchestration of network slicing for next generation network (Release 15),Sep. 2017,total 78 pages.

* cited by examiner

SYSTEM AND INTERFACE FOR CROSS ADMINISTRATION OR TECHNOLOGY DOMAIN NETWORK FUNCTIONS (NFS) INSTANTIATION AND CONFIGURATION FOR ROAMING USERS

CROSS-REFERENCE TO RELATED APPLICATIONS

This application is a continuation of International Application No. PCT/EP2017/079449, filed on Nov. 16, 2017, the disclosure of which is hereby incorporated by reference in its entirety.

TECHNICAL FIELD

Embodiments of the present invention relate to the field of wireless communications, and more particularly to user roaming across operators using an inter-operator interface within a network slicing architecture.

BACKGROUND

According to the industry consensus, the 5th Generation (5G) mobile technology will be standardized and deployed by 2020. Compared to the 4th Generation (4G) mobile technology, the devices and applications of the next generation network will support use cases with a very high diversity in terms of performance attributes, such as ultra-reliable communications for mission critical services, eHealth, public safety, real-time vehicle control, tactile Internet and connectivity for drones. In order to support services with such a diverse range of requirements, the architecture fitting all the solutions used in the 4G network will be not scalable for the myriad of different use cases. Thus, the network slicing concept is expected to be one of the key building blocks of the future 5G network according to the recent standardization agreements. Indeed, the current understanding of the 5G architecture is that each type of device or application will have its own architectural slice, which will be configured just for their requirements. The device or application will be provided by a slice owner and hosted by an operator, and the slice owner will be a vertical or an Over-The-Top (OTT) provider of the device or application, so that the network slicing concept will enable a service-tailored network function provisioning scheme aiming in particular at vertical industries integration.

According to the Technical Report (TR) entitled: 3GPP TR 28.801, "Study on management and orchestration of network slicing for next generation network", V15.0.0 (2017-09), a network slice is composed of a collection of logical Network Functions (NFs) that supports the communication service requirements of particular use case(s). On the other hand, the Technical Specification (TS) entitled: 3GPP TS 23.501, "System architecture for the 5G system", V1.4.0 (2017-09), defines a network slice as a complete logical network that comprises a set of NFs and corresponding resources, which are necessary to provide certain network capabilities and network characteristics. A network slice may include both an Access Network (AN) and a Core Network (CN), and a Network Slice Instance (NSI) may be defined as the instantiation of a network slice, i.e., as a deployed set of NFs delivering the intended network slice services.

The support of network slicing is enabled by the architecture modularization design principle stating that the 5GS reference architecture features the core network decomposition into orthogonal sets of NFs for Control Plane (CP or C-plane) and User Plane (UP or U-plane). The CP NFs are classified as Common Control NFs (CCNFs) and Slice-specific Control NFs (SCNFs), in order to distinguish between the NFs that may be shared among multiple NSIs and those that are NSI-specific.

Many users may frequently roam from one operator to another one. In particular, support for vehicle-to-X (V2X)-like use cases may also imply that, for some users, an operator can predict when a car would leave its coverage area and enter another area covered by other operators.

As disclosed in the above-mentioned 3GPP TS 23.501, different non-roaming and roaming reference architectures may be considered.

FIG. 1 shows a non-roaming 5G system architecture using a service-based interface representation within the CP. Therein, all NFs deployed in the CP (i.e., all CP NFs) and in the UP (i.e., all UP NFs) belong to a same administrative domain like, for example, a Public Land Mobile Network (PLMN), which may also be denoted as a Home PLMN (HPLMN, also denoted as hPLMN) since there is no user roaming.

As therein depicted, the 5G system architecture may consist of the following CP NFs and CP entities:
 Network Slice Selection Function (NSSF);
 Network Exposure Function (NEF);
 NF Repository Function (NRF);
 Policy Control function (PCF);
 Unified Data Management (UDM);
 Application Function (AF);
 Authentication Server Function (AUSF);
 Access and Mobility Management Function (AMF);
 Session Management Function (SMF).

Those CP NFs are capable of delivering a respective service and are interconnected to other CP NFs being authorized to access their services, via service-based interfaces denoted as Nxxx (e.g., Naf, Nausf, Namf and so on) for the CP NF denoted as xxx (e.g., AF, AUSF, AMF and so on).

Furthermore, the 5G system architecture may consist of the following CN NFs and CN entities:
 User Plane Functions (UPFs);
 User Equipment (UE);
 (Radio) Access Network ((R)AN);
 Data Network (DN), e.g., operator services, Internet access or third party services.

The functional description of these CP NFs, CP entities, CN NFs and CN entities may be found in clause 6 of 3GPP TS 23.501, V1.4.0 (2017-09).

As further depicted, the 5G system architecture may also include point-to-point reference points denoted as Ni, where i=1, 2, 3, .... Thus, the UE, which is connected to the (R)AN via an access interface, may be connected to the AMF via a N1 interface. The (R)AN may be connected to the AMF via a N2 interface and to the UPF via a N3 interface. The UPF may be connected to the SMF via a N4 interface and to the DN via a N6 interface.

Except for the DN, which is external to the HPLMN, and the AF, which may be provided by a third party, all NFs belong to the same HPLMN and are therefore managed by a same Home Operator Management System (HOMS) (also designated as Home Operator's Management System).

FIG. 2 shows a roaming 5G system architecture using the service-based interface representation within the CP in the case of a Local Break-Out (LBO) scenario with the AF in a Visited or Visitor PLMN (VPLMN, also denoted as vPLMN).

For that LBO scenario, in comparison with the non-roaming reference architecture of FIG. 1, all UPFs belong to the VPLMN and some CP NFs are split between the VPLMN and the HPLMN. In particular, the UDM and the AUSF belong to the HPLMN only, while the NRF, the PCF and the NEF are duplicated both in the VPLMN and the HPLMN, while the NSSF, the AMF, the SMF and the AF belong to the VPLMN only.

Furthermore, the (R)AN and the DN belong to the VPLMN, so that the connections between the (R)AN and the UPF via the N3 interface and between the UPF and the DN via the N6 interface occur in the VPLMN.

FIG. 3 shows a roaming 5G system architecture using the service-based interface representation within the CP in the case of a LBO scenario with AF in the HPLMN.

This LBO scenario differs from that of FIG. 2 only in that the AF now belongs to HPLMN.

FIG. 4 shows a roaming 5G system architecture using the service-based interface representation within the CP in the case of a Home Routed (HR) scenario.

For that HR scenario, all UPFs belong both to the VPLMN and the HPLMN, wherein the N6 interface between the UPF and the DN is terminated in the HPLMN. Some CP NFs are split between the VPLMN and the HPLMN. In particular, the UDM, the AUSF and the AF belong to the HPLMN only, while the NRF, the PCF, the NEF and the SMF are duplicated both in the VPLMN and the HPLMN, while the NSSF and the AMF belong to the VPLMN only.

Furthermore, the (R)AN belongs to the VPLMN, so that the connection between the (R)AN and the UPF in the VPLMN via the N3 interface occurs in the VPLMN, while the UPF in the VPLMN is also connected to the UPF in the HPLMN via a N9 interface.

For each roaming scenario of FIGS. 2 to 4, it may be assumed that the VPLMN and HPLMN are respectively managed by a distinct Network Management System (NMS), which may be referred to as a Visited or Visitor NMS (VNMS) for the VPLMN and a Home NMS (HNMS) for the HPLMN. This assumption is presented in 3GPP TR 28.801, V15.0.0 (2017-09) and based on the fact that the definition of VPLMN and HPLMN originates from different owners having different management systems.

Further, it can be readily observed that the roaming scenarios represent particular deployments, in which an end-to-end (E2E) network slice spans across different PLMNs, i.e., across different administrative domains.

However, a NF in the HPLMN has no information about or no awareness of the NFs in the VPLMN and vice versa. It results therefrom that, in 5G, a first look-up shall be performed by the VPLMN in order to identify the HPLMN that is responsible for the UE, followed by a second look-up to be performed by said HPLMN in order to find the NF(s) in the HPLMN responsible for serving the UE.

The first look-up is rather straightforward in Long Term Evolution (LTE), because the UE Subscriber Identity Module (SIM) is capable of specifying a priority list with the Mobile Country Code (MCC) followed by the Mobile Network Code (MNC) in the HPLMN selector with Access Technology (AT). The same applies to 5G. However, the LTE-like solution is too static with respect to the billions of connected devices in 5G and the ability to support a dynamic re-configurability.

The second lookup is currently carried out by NFs in the HPLMN.

The problem with the current definition of the 5G systems combined with the incumbent requirement of operating network slices spanning across multiple PLMNs (i.e., HPLMNs and/or VPLMNs) is that such cases are assumed to be handled merely as roaming scenarios, which may render the E2E slice performance requirements difficult to meet. In this connection, the key limitations of the roaming scenarios may, for example, be a limited visibility and accessibility by the VPLMN CP NFs (e.g., AMF) and the HPLMN CP NFs (e.g., NSSF, NRF) that are essential to network slices operations, a limited visibility and accessibility by the VPLMN and HPLMN CP NFs of the UPFs, thereby impairing the ability of monitoring and enforcing the E2E Quality of Service (QoS), and a need to involve the HPLMN CP NFs to access information (e.g., registration, session management procedures, mobility management procedures) necessary to complete E2E slicing related procedure.

Such key limitations are deemed to be performance critical. Indeed, the E2E procedure shall disadvantageously require supplementary VPLMN-to-HPLMN signaling, such as SMFs duplication in VPLMN and/or HPLMN and credential retrieval at AUSF in HPLMN (i.e., at hAUSF) among others. In addition, the E2E procedure may be disadvantageously affected by extra latency/delay when the VPLMNs and HPLMNs are, for example, connected via transoceanic connections, satellite links and/or third party networks, thereby rendering the possibility of running delay sensitive applications across such operators difficult.

SUMMARY

It is therefore an object of embodiments of the present invention to allow an efficient user roaming across operators or operator management systems (OMSs).

The object is achieved by the features of the independent claims. Further embodiments of the invention are apparent from the dependent claims, the description and the drawings.

In one aspect, an embodiment of the invention relates to an operator management system (OMS) (also designated as operator's management system) in a first administrative domain (e.g., HPLMN) for supporting a user roaming from the first administrative domain to a second administrative domain (e.g., VPLMN) within a network architecture. The OMS in the first administrative domain may be configured to generate and issue to an OMS in the second administrative domain, a roaming management request for roaming a user (e.g., UE) from the first administrative domain to the second administrative domain, over an inter-operator management interface (OP-OP interface), and configured to instruct the OMS in the second administrative domain to configure the second administrative domain based on the roaming management request to support the user roaming. The network architecture may comprise a collection of interconnected network functions (NFs) deployed in a control plane (CP) and a user plane (UP), and the interconnected network functions (NFs) may comprise at least core network control plane functions (CN-CPFs) and a core network user plane function (CN-UPF).

Thereby, the UP and CP performance in roaming scenarios can be optimized in terms, for example, of latency and reliability, due to the usage of "local" (i.e., located in the VPLMN) instances of CP and UP functions in such roaming scenarios, the roaming user (e.g., UE) being controlled by the VPLMN NFs while being still under the management of the HPLMN. This leads to better support the roaming of the user by possibly achieving a faster authorization, a local break-out and a reduced inter-PLMN signaling.

In one embodiment, inside the OMS in the first administrative domain, the roaming management request may be generated by a long-term data and user behavior analysis program having the capability of identifying the roaming user as a high probability roaming user.

In one embodiment, the OMS may comprise at least one management function entity amongst a service management function (SMF) entity, a network slice management function (NSMF) entity, a network slice subnet management function (NSSMF) entity and an infrastructure management function (IMF) entity, and comprise at least one delegation entity configured to delegate the roaming management request to the corresponding management function entity of the OMS in the second administrative domain. The management function entity may be configured to manage a respective managed entity being one amongst a sub-service or service when the management function entity is the SMF, a network slice instance (NSI) or network slice when the management function entity is the NSMF, a network slice subnet instance (NSSI) or network slice subnet when the management function entity is the NSSMF and an infrastructure when the management function entity is the IMF, the infrastructure comprising network functions (NFs), virtualized network functions (VNFs) and basic resources. The delegation entity may be configured to be an end-point of the OP-OP interface between the OMS in the first administrative domain and the OMS in the second administrative domain. And the roaming management request may be provided by the OMS in the first administrative domain at a managed entity layer to the OMS in the second administrative domain at a corresponding managed entity layer, wherein a delegation entity of the OMS in the second administrative domain may receive the roaming management request and delegate the roaming management request to a corresponding managed entity of the OMS in the second administrative domain.

It shall be noted that the management function entities (i.e., CSMF, SMF, NSMF, NSSMF, IMF) may be separated from or collocated/grouped with any other management function entities inside the corresponding OMS. If collocated/grouped, the individual functionalities inside a group of management function entities may then be combined into a single overall functionality.

It shall be further noted that the term "delegate" may be used here in the sense of "transmit after analysis of the incoming request followed by a selection of the management function entity".

It shall be also noted that the delegation entity may be separated from the management function entities or collocated with at least one management function entity inside the corresponding OMS.

In one embodiment, the roaming management request may comprise configuration parameters and/or deployment parameters.

It shall be noted that the above-mentioned term "parameter(s)" may be interchangeably used with the term "argument(s)" in embodiments of the present invention.

In one embodiment, the roaming management request may be a request for configuring a first NF (e.g., vNRF) in the second administrative domain (e.g., VPLMN) corresponding to a second NF (e.g., hNRF) in the first administrative domain (e.g., HPLMN), based on the configuration parameters in order to connect the first NF in the second administrative domain to the second NF in the first administrative domain.

In one embodiment, the configuration parameters may comprise at least one amongst a list of user identifications (e.g., UE IDs) for which the requested configuration is valid, a user group identification (e.g., a caller subscriber group ID) for which the requested configuration is valid, services and/or slices for which the requested configuration is valid, and an address of the second NF (e.g., hNRF) in the first administrative domain (e.g., HPLMN).

In one embodiment, the roaming management request may be a request for instantiating and configuring a third NF (e.g., pNRF) in the second administrative domain (e.g., VPLMN) corresponding to a fourth NF (e.g., hNRF) in the first administrative domain (e.g., HPLMN), based on the configuration parameters in order to connect the third NF in the second administrative domain to the fourth NF in the first administrative domain.

In one embodiment, the third NF in the second administrative domain may be a proxy NF.

In one embodiment, the configuration parameters may comprise at least one amongst a list of user identifications (e.g., UE IDs) and services for which the requested configuration is valid, an address of the fourth NF (e.g., hNRF) in the first administrative domain (e.g., HPLMN), an image of the third NF (e.g., pNRF), instructions for onboarding and life cycle management, and instructions and parameters for performance management (PM), fault management (FM) and configuration management (CM) of the third NF (e.g., pNRF).

In one embodiment, the roaming management request may be a request for embedding a fifth NF (e.g., hAUSF) of the first administrative domain (e.g., HPLMN) into the second administrative domain (e.g., VPLMN) by instantiating and configuring the fifth NF in the second administrative domain based on the configuration parameters in order to interconnect the embedded fifth NF (e.g., pAUSF) with the NFs in the second administrative domain.

In one embodiment, the configuration parameters may comprise at least one amongst a list of user identifications (e.g., UE IDs) and services for which the requested configuration is valid, an address of the fifth NF (e.g., hAUSF) in the first administrative domain (e.g., HPLMN), an image of the embedded fifth NF (e.g., pAUSF), instructions for onboarding and life cycle management, and instructions and parameters for performance management (PM), fault management (FM) and configuration management (CM) of the embedded fifth NF (e.g., pAUSF).

In one embodiment, the roaming management request may be a request for embedding a sixth NF (e.g., hNRF) of the first administrative domain (e.g., HPLMN) into a seventh NF (e.g., vNRF) in the second administrative domain (e.g., VPLMN) by instantiating and configuring the sixth NF in the seventh NF, based on the configuration parameters.

It shall be noted that the sixth NF may be instantiated in the seventh NF as a part of the seventh NF if created from the seventh NF or, if otherwise created, as a separate entity with respect to the seventh NF.

In one embodiment, the configuration parameters may comprise at least one amongst a list of user identifications (e.g., UE IDs) for which the requested configuration is valid, a user group identification (e.g., a caller subscriber group ID) for which the requested configuration is valid, services and/or slices for which the requested configuration is valid, and an address of the sixth NF (e.g., hNRF) in the first administrative domain (e.g., HPLMN).

In one embodiment, the OMS in the first administrative domain may be configured to request a deployment, at the corresponding managed entity layer, of at least one managed entity in the OMS in the second administrative domain, the deployment being based on the deployment parameters, and configured to request a configuration, at the corresponding managed entity layer, to the OMS in the second administrative domain, the configuration being based on the configuration parameters to use the deployed managed entity.

In one embodiment, the CN-CPFs may comprise at least one amongst an access and mobility management function (AMF), a session management function (SMF), a policy control function (PCF), a network exposure function (NEF), a network repository function (NRF), a unified data management (UDM), an authentication server function (AUSF), an application function (AF), and a network slice selection function (NSSF).

The above object is also solved in accordance with another embodiment.

According to another aspect, an embodiment of the invention relates to an operator management system (OMS) (also designated as operator's management system) in a third administrative domain (e.g., VPLMN) for supporting a user roaming from a fourth administrative domain (e.g., HPLMN) to the third administrative domain within a network architecture. The OMS in the third administrative domain may be configured to receive, from an OMS in the fourth administrative domain, a roaming management request for roaming a user (e.g., UE) from the fourth administrative domain to the third administrative domain, over an inter-operator management interface (OP-OP interface), and configured to configure the third administrative domain based on the received roaming management request to support the user roaming.

The above object is also solved in accordance with another embodiment.

According to another aspect, an embodiment of the invention relates to a system within a network architecture. The system may at least comprise an operator management system (OMS) (also designated as operator's management system) in an administrative domain (e.g., HPLMN) as claimed in the embodiment and/or any one of the implementation forms of the embodiment, and an operator management system (OMS) (also designated as operator's management system) in another administrative domain (e.g., VPLMN) as claimed in another embodiment. Each OMS may communicate to each other over an inter-operator management interface (OP-OP interface).

The above object is also solved in accordance with another embodiment.

According to another aspect, an embodiment of the invention relates to a method for supporting a user roaming from a first administrative domain (e.g., HPLMN) to a second administrative domain (e.g., VPLMN) within a network architecture. The method may be performed at an operator management system (OMS) (also designated as operator's management system) in the first administrative domain and comprise the operations of generating and issuing to an OMS in the second administrative domain, a roaming management request for roaming a user (e.g., UE) from the first administrative domain to the second administrative domain, over an inter-operator management interface (OP-OP interface), and the operation of instructing the OMS in the second administrative domain to configure the second administrative domain based on the roaming management request to support the user roaming. The network architecture may comprise a collection of interconnected network functions (NFs) deployed in a control plane (CP) and a user plane (UP), and the interconnected network functions (NFs) may comprise at least core network control plane functions (CN-CPFs) and a core network user plane function (CN-UPF).

In one embodiment, the method may comprise the operation of requesting a deployment, at a managed entity layer, of at least one managed entity in the OMS in the second administrative domain, the deployment being based on the deployment parameters, and the operation of requesting a configuration, at the managed entity layer, to the OMS in the second administrative domain, the configuration being based on the configuration parameters to use the deployed managed entity.

The above object is also solved in accordance with another embodiment.

According to another aspect, an embodiment of the invention relates to a method for supporting a user roaming from a fourth administrative domain (e.g., HPLMN) to a third administrative domain (e.g., VPLMN) within a network architecture. The method may be performed at an operator management system (OMS) (also designated as operator's management system) in the third administrative domain and comprise the operation of receiving, from an OMS in the fourth administrative domain, a roaming management request for roaming a user (e.g., UE) from the first administrative domain to the second administrative domain, over an inter-operator management interface (OP-OP interface), and the operation of configuring the third administrative domain based on the received roaming management request to support the user roaming.

The above object is also solved in accordance with another embodiment.

According to another aspect, an embodiment of the invention relates to a computer program comprising a program code for performing the method according to any one of the embodiments and their respective implementation forms when executed on a computer.

Thereby, the method can be performed in an automatic and repeatable manner.

The computer program can be performed by the above apparatuses.

In particular, it should be noted that all the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

It shall further be understood that an embodiment of the invention can also be any combination of the dependent claims or above embodiments with the respective independent claim.

These and other embodiments of the invention will be apparent and elucidated with reference to the embodiments described hereinafter.

BRIEF DESCRIPTION OF THE DRAWINGS

In the following detailed portion of the present disclosure, the invention will be explained in more detail with reference to the exemplary embodiments shown in the drawings, in which.

Identical reference signs are used for identical or at least functionally equivalent features.

DETAILED DESCRIPTION OF EMBODIMENTS OF THE INVENTION

In embodiments of the present invention, a network slice, also designated as a slice, will be defined as a collection of interconnected logical access network (AN) functions and core network (CN) functions capable of meeting a diverse range of requirements.

In addition, business roles will be played by a customer, a service provider, a slice provider, a partial slice provider and an infrastructure provider.

The customer may be defined as a final customer whose role is to request and own the service. Then, the customer may, for example, sell the service to service end-users. The customer may comprise a customer service management function (CSMF) entity as a management function entity. The CSMF entity may be configured to manage the service as a managed entity.

The service provider may play the same role as a traditional operator by providing a sub-service or service as well as the virtualized network functions (VNFs) and the complete design of the sub-service itself to the customer. The service provider may comprise a service management function (SMF) entity as a management function entity. The SMF entity may be configured to manage the sub-service or service as a managed entity.

The role of the slice provider may be to create and operate the slice and provide it to the service provider. The slice provider may comprise a network slice management function (NSMF) entity as a management function entity. The NSMF entity may be configured to manage a network slice instance (NSI) or network slice as a managed entity.

The role of the partial slice provider may be to provide parts of the slice to the slice operator. The partial slice provider may comprise a network slice subnet management function (NSSMF) entity as a management function entity. The NSSMF entity may be configured to manage a network slice subnet instance (NSSI) or network slice subnet as a managed entity, the NSSI or slice subnet being a part of the NSI or network slice.

The role of the infrastructure provider may be similar to that of the owner of the actual physical infrastructure. The infrastructure provider may comprise an infrastructure management function (IMF) entity as a management function entity. The IMF entity may be configured to manage an infrastructure as a managed entity, by managing and orchestrating the network functions (NFs), the virtualized network functions (VNFs) and the basic physical or virtual resources (e.g., compute, storage and networking).

Figure 5:
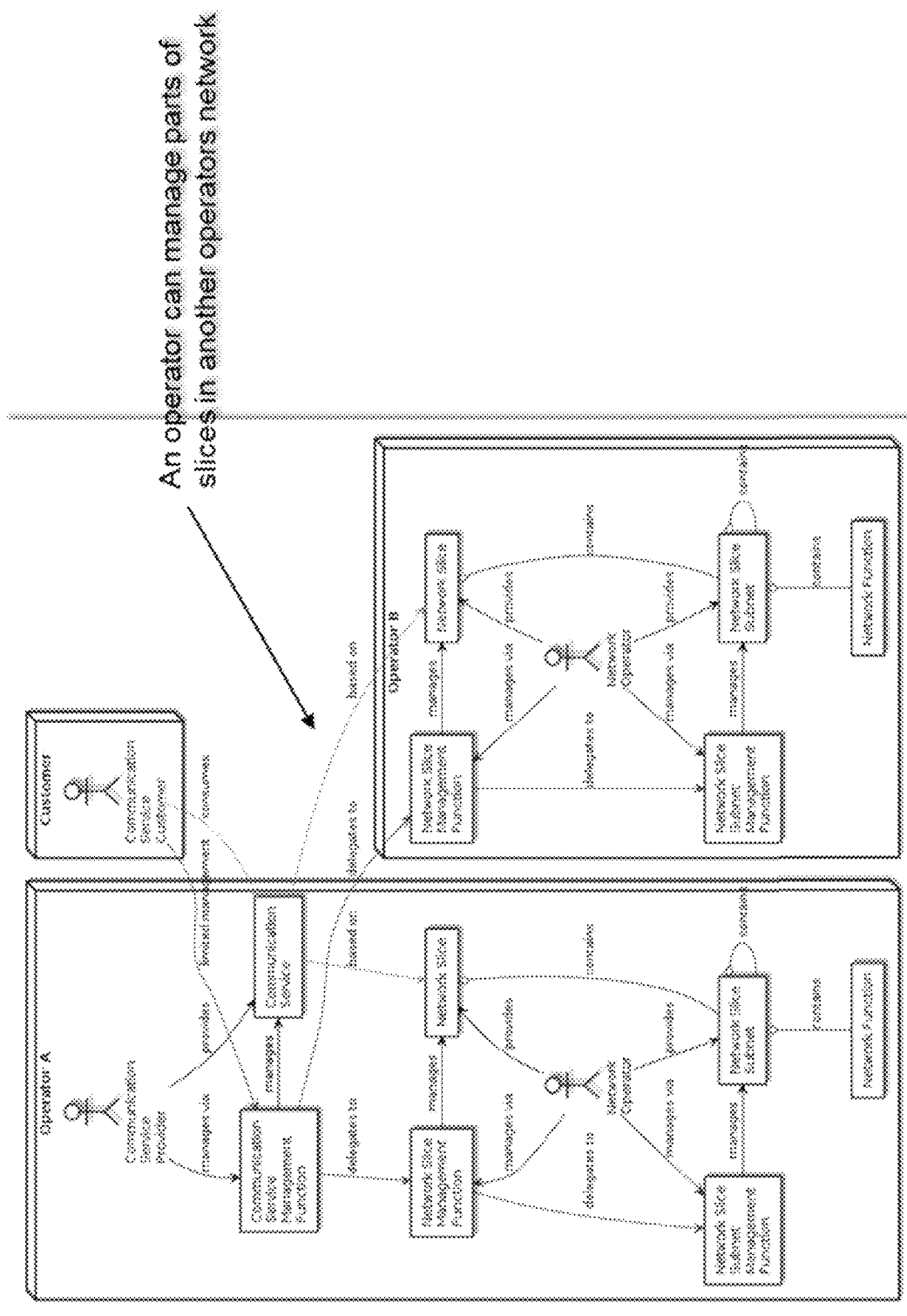
FIG. 5 shows an OMS-to-OMS interface for multi-operator NSI creation, according to 3GPP TR 28.801, V15.0.0 (2017-09)

According to 3GPP standards, an operator can expose interfaces to other operators. In particular, FIG. 5 shows an OMS-to-OMS interface (i.e., an inter-operator management interface between the operator A and the operator B, which may also be designated as OP-OP interface) for multi-operator NSI creation, according to 3GPP TR 28.801, V15.0.0 (2017-09). Therein, the customer requests a communication service for realizing an NSI to a single OMS (i.e., to the operator A). Then, the Communication Service Management Function (CSMF) hosted in the operator A decides to use the NSMF of another OMS (i.e., of the operator B) to realize the NSI. In this particular case, the operator A exposes an interface to the operator B during the life cycle management of the NSI, the operator A being responsible for the management of the NSI in the operator B. In a non-limitative embodiment, the operator A may also be responsible for the management of any other managed entities (e.g., NSSI, infrastructure) in the operator B.

Figure 6:
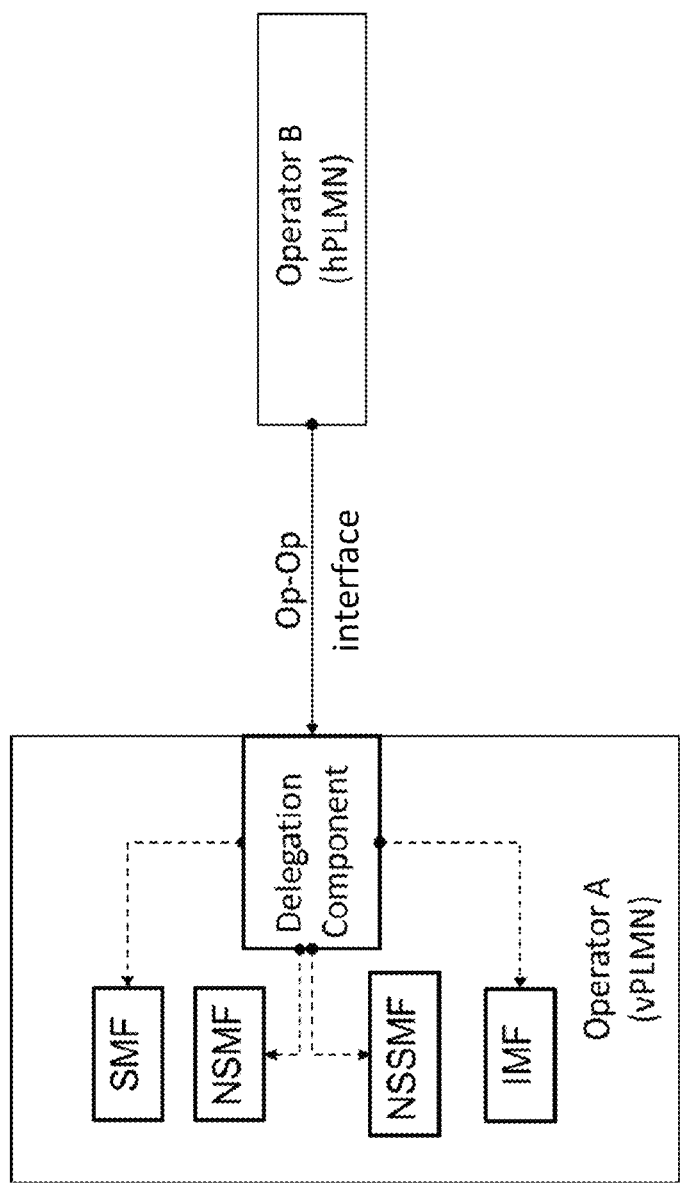
FIG. 6 shows a schematic bloc diagram of an operator A in an administrative domain (depicted as VPLMN) receiving an external service request from an operator B in another administrative domain (depicted as HPLMN) over an inter-operator management interface (depicted as OP-OP interface)

FIG. 6 shows a schematic bloc diagram of an operator A in an administrative domain (depicted as VPLMN) receiving an external service request from an operator B in another administrative domain (depicted as HPLMN) over an inter-operator management interface (depicted as OP-OP interface).

As an OMS, each operator may comprise at least one delegation component (designated hereafter as delegation entity), at least one SMF, at least one NSMF, at least one NSSMF and at least one IMF.

The delegation entity may be configured to delegate an incoming request from an operator at a managed entity layer to a management function entity of another operator corresponding to the managed entity layer. In embodiments of the present invention, the incoming request may be a roaming management request for roaming a user (e.g., a UE) from an operator to another one. In FIG. 6, the delegation entity of the operator A may delegate the external service request as the incoming request from the operator B at a specific managed entity layer (amongst the SMF, NSMF, NSSMF and IMF layers) to a management function entity of the operator A corresponding to the specific managed entity layer. In other terms, the delegation entity of the operator A may perform an analysis of the incoming request followed by a selection of an appropriate management function entity, and then transmit the incoming request to the selected management function entity.

In addition, the delegation entity may be configured to be an end-point of the OP-OP interface between the operator B (i.e., the OMS in the HPLMN) and the operator A (i.e., the OMS in the VPLMN). In particular, the end-point may provide a programmable interface in the operator in which it is hosted (e.g., the operator A when referring to FIG. 6) to any other operator (e.g., the operator B when referring to FIG. 6).

In an OMS, the delegation entity may be separated from the management function entities or collocated with at least one management function entity inside the OMS.

Any of these management functions (e.g., SMF, NSMF, NSSMF, IMF) may be separated from or collocated/grouped with any other management function entity. If collocated/grouped, the individual functionalities inside a group of management function entities may then be combined into a single overall functionality.

In embodiments of the present invention, the incoming request may be a roaming management request for roaming at least one user (e.g., UE) from an administrative domain (e.g., a HPLMN), to which the operator B belongs, to another administrative domain (e.g., VPLMN), to which the operator A belongs, within a network architecture. Such a network architecture may be based on one of the roaming reference architectures as disclosed in 3GPP TS 23.501, V1.4.0 (2017-09). Only for the sake of simplicity, the network architecture will refer, in a non-limitative embodiment, to the roaming 5G system architecture of FIG. 2, unless otherwise indicated.

Figure 7:
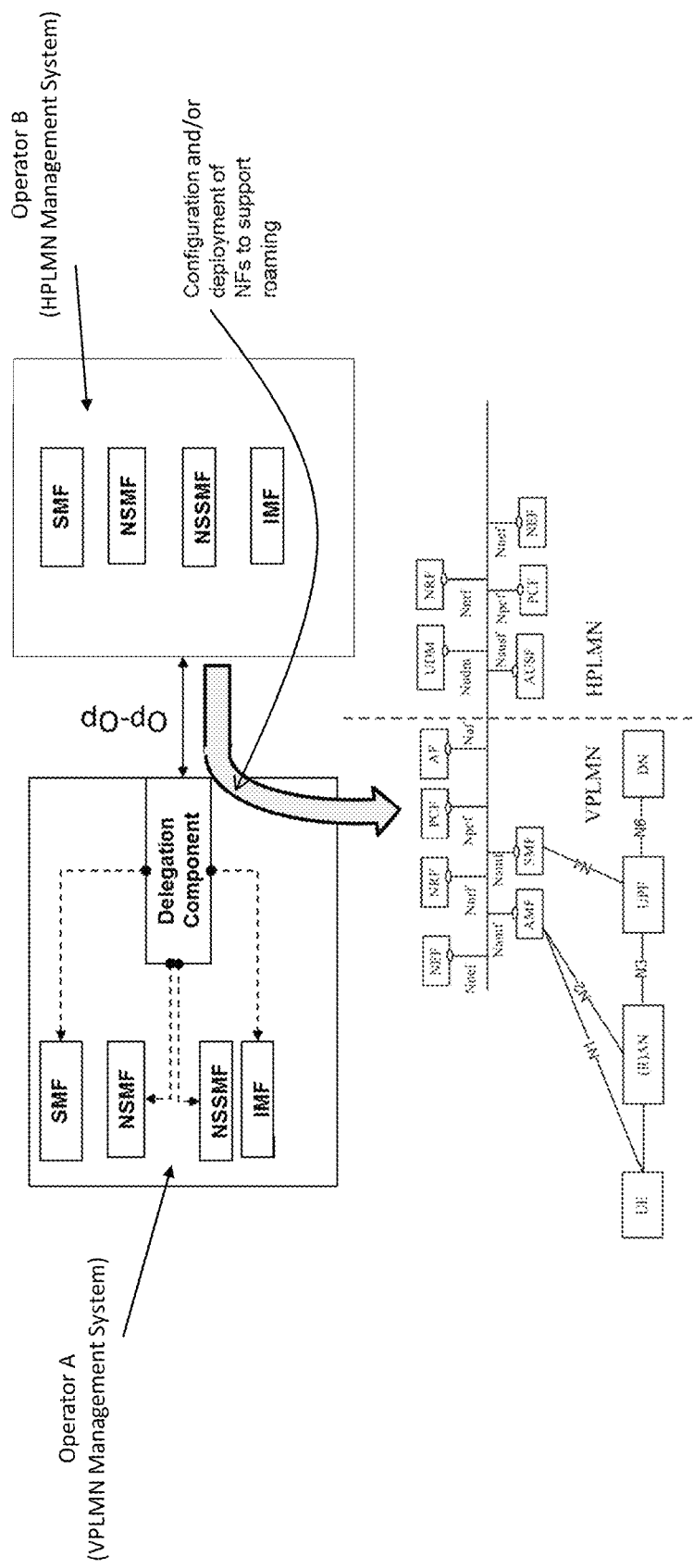
FIG. 7 shows a schematic diagram illustrating a configuration and/or deployment of NFs to support a user roaming, according to an embodiment of the present invention.

FIG. 7 shows a schematic diagram illustrating a configuration and/or deployment of NFs to support a user roaming, according to an embodiment of the present invention.

Figure 1:
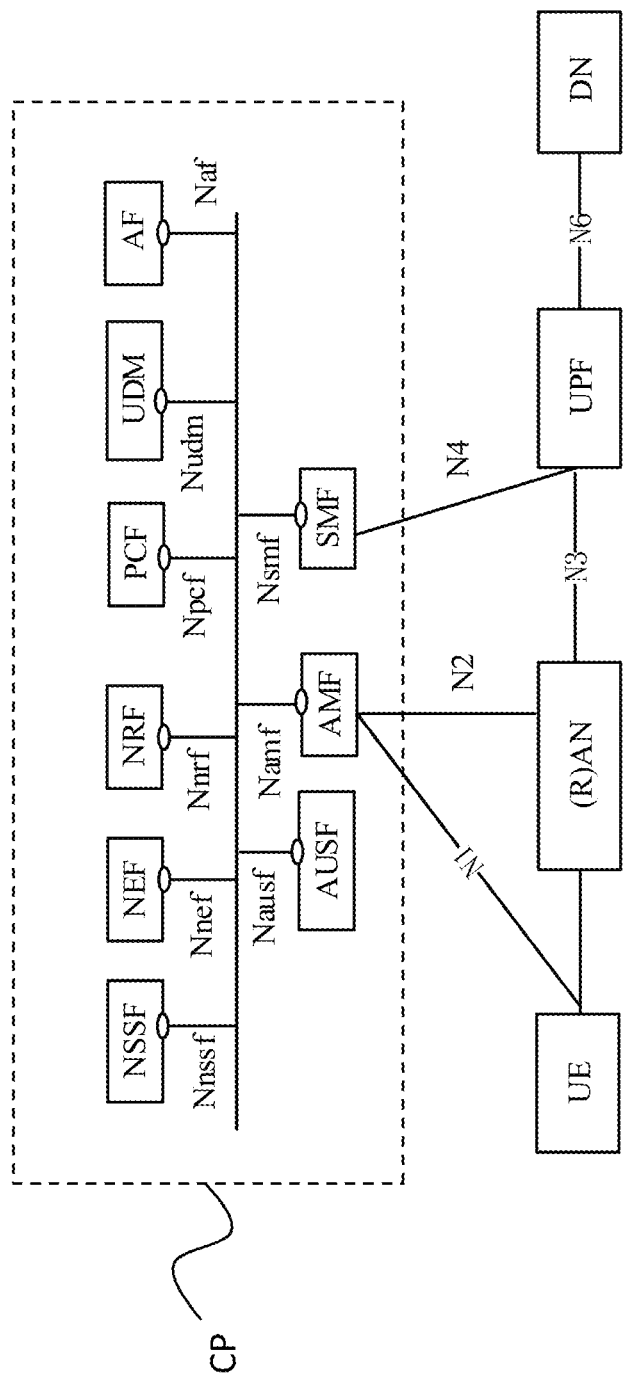
FIG. 1 shows a non-roaming 5G system architecture using a service-based interface representation within the CP, according to 3GPP TS 23.501, V1.4.0 (2017-09)
Figure 2:
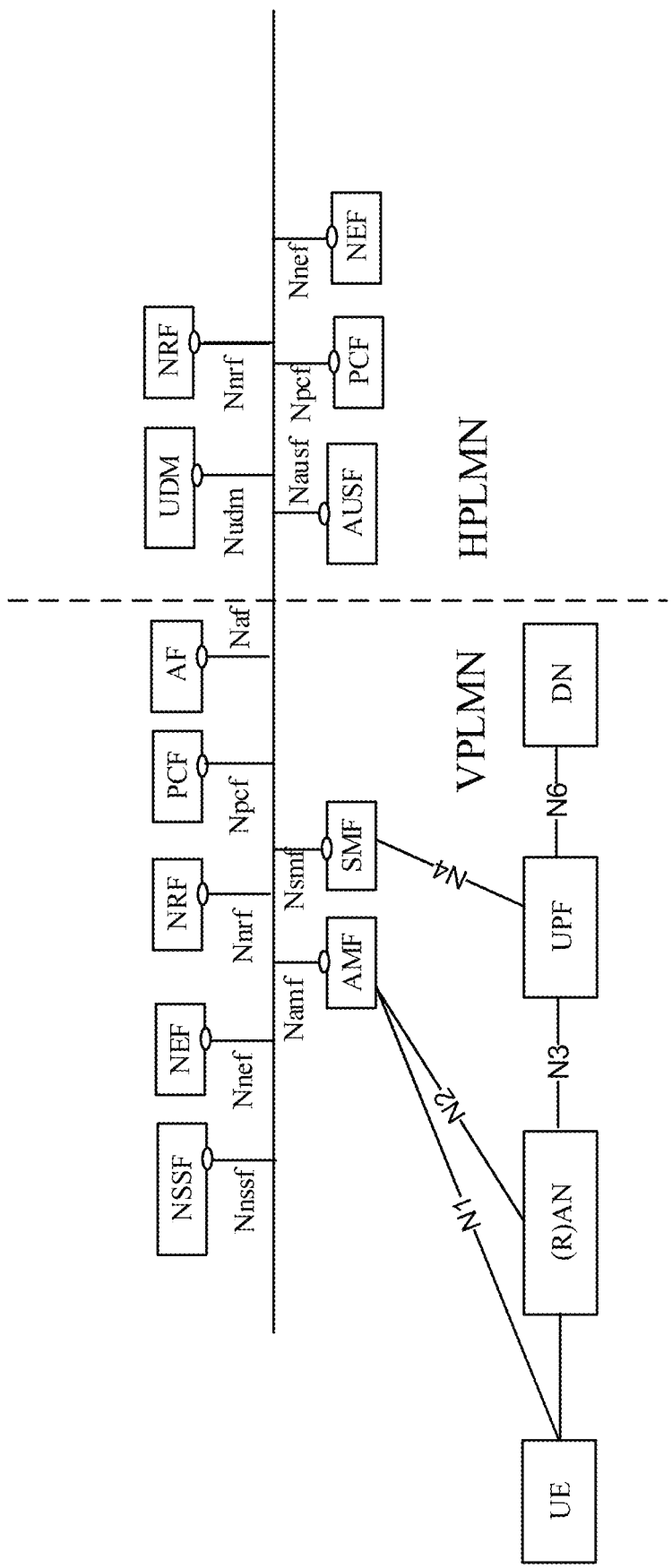
FIG. 2 shows a roaming 5G system architecture using the service-based interface representation within the CP in the case of a LBO scenario with AF in the VPLMN, according to 3GPP TS 23.501, V1.4.0 (2017-09)
Figure 3:
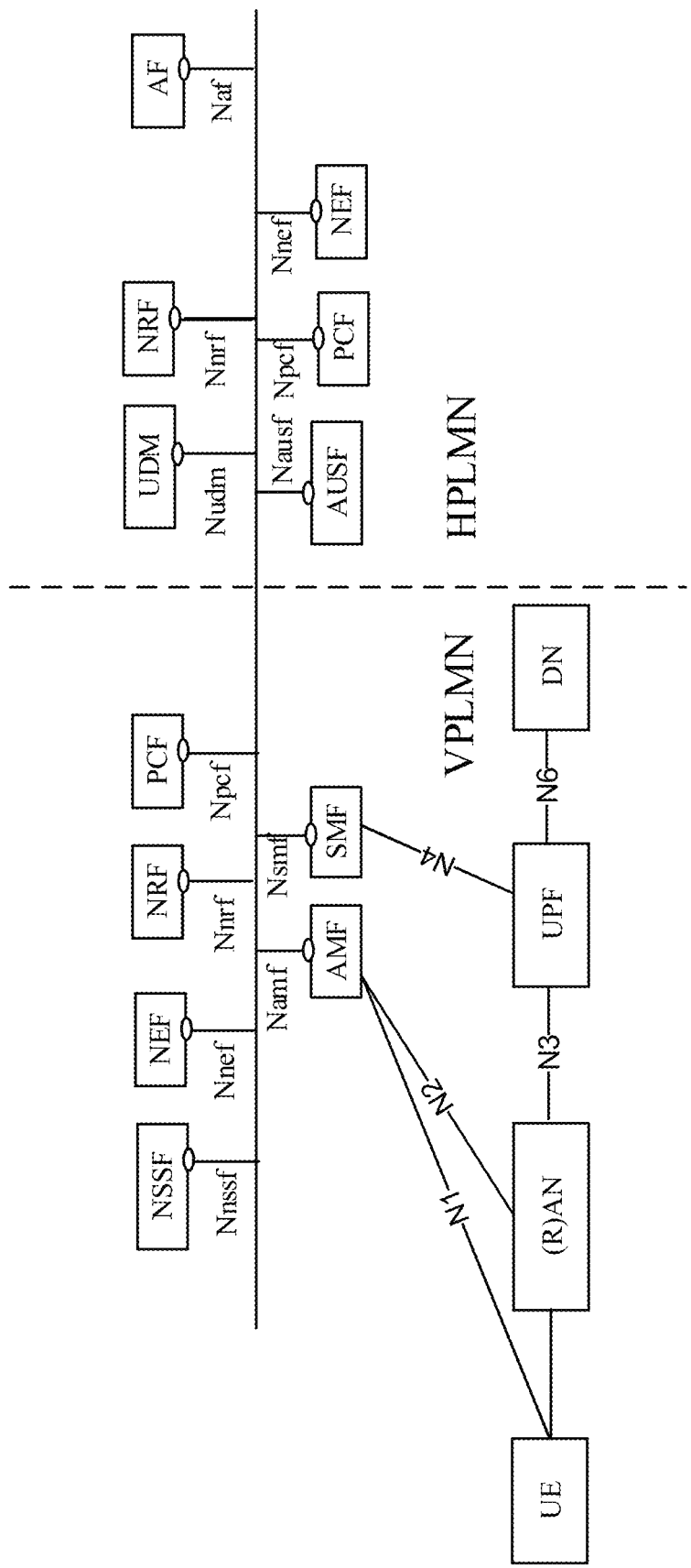
FIG. 3 shows a roaming 5G system architecture using the service-based interface representation within the CP in the case of a LBO scenario with AF in the HPLMN.
Figure 4:
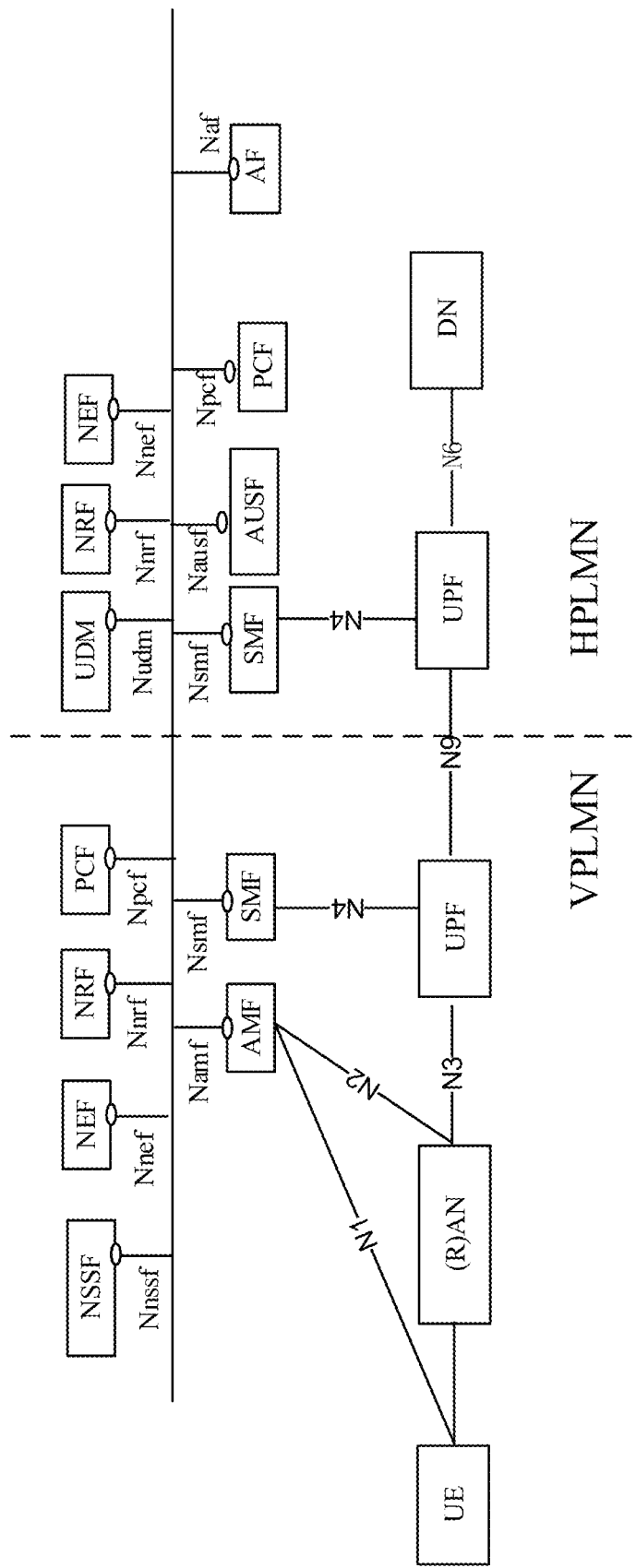
FIG. 4 shows a roaming 5G system architecture using the service-based interface representation within the CP in the case of a HR scenario.

Therein, a roaming management request, for roaming at least one user (e.g., UE) from the HPLMN to the VPLMN within the roaming 5G system architecture of FIG. 2, is generated by the operator B (as an OMS in the HPLMN), and issued from the operator B to the operator A (as an OMS in the VPLMN) over the OP-OP interface (i.e., the inter-operator management interface), in order to instruct the operator A to configure at least one NF in its PLMN (i.e., VPLMN) based on configuration parameters contained in the roaming management request in order to support the user roaming, and/or in order to deploy at least one NF in its PLMN (i.e., VPLMN) based on deployment parameters contained in the roaming management request in order to support the user roaming.

Prior to achieving the configuration and/or the deployment, the operator A in the VPLMN may check that the requested configuration and/or deployment are allowable and not conflicting with the existing configurations in the VPLMN. If any detected conflict, the operator A in the VPLMN may then signal the corresponding failure to the detected conflict to the operator B in the HPLMN.

At a layer or level of the management function entities depicted as SMF, NSMF, NSSMF and IMF, the operator B in the HPLMN may request a respective deployment of new services, slices, slice subnets and/or physical or virtual infrastructure including NFs at a layer or level of the corresponding management function entities in the operator A in the VPLMN. The operator B in the HPLMN may then instruct the operator A in the VPLMN to configure the NFs in the VPLMN to use the deployed infrastructure to host the at least one user (e.g., UE).

In a first embodiment, the present invention allows to create a direct connectivity between NF instance(s) in the VPLMN and NF instance(s) in the HPLMN, namely between vNF(s) and hNF(s). This direct connectivity may be provided via dedicated high reliability and high speed links and allows to create logical NFs whose instances are actually deployed across the different administrative domains (i.e., across HPLMN and VPLMN). Over the OP-OP interface, the OMS in the HPLMN (also denoted as hPLMN MS) interacts with the OMS in the VPLMN (also denoted as vPLMN MS). The IMF in the VPLMN (denoted as vIMF) and the IMF in the HPLMN (denoted as hIMF) create a direct link between hNF(s) and vNF(s).

Figure 8:
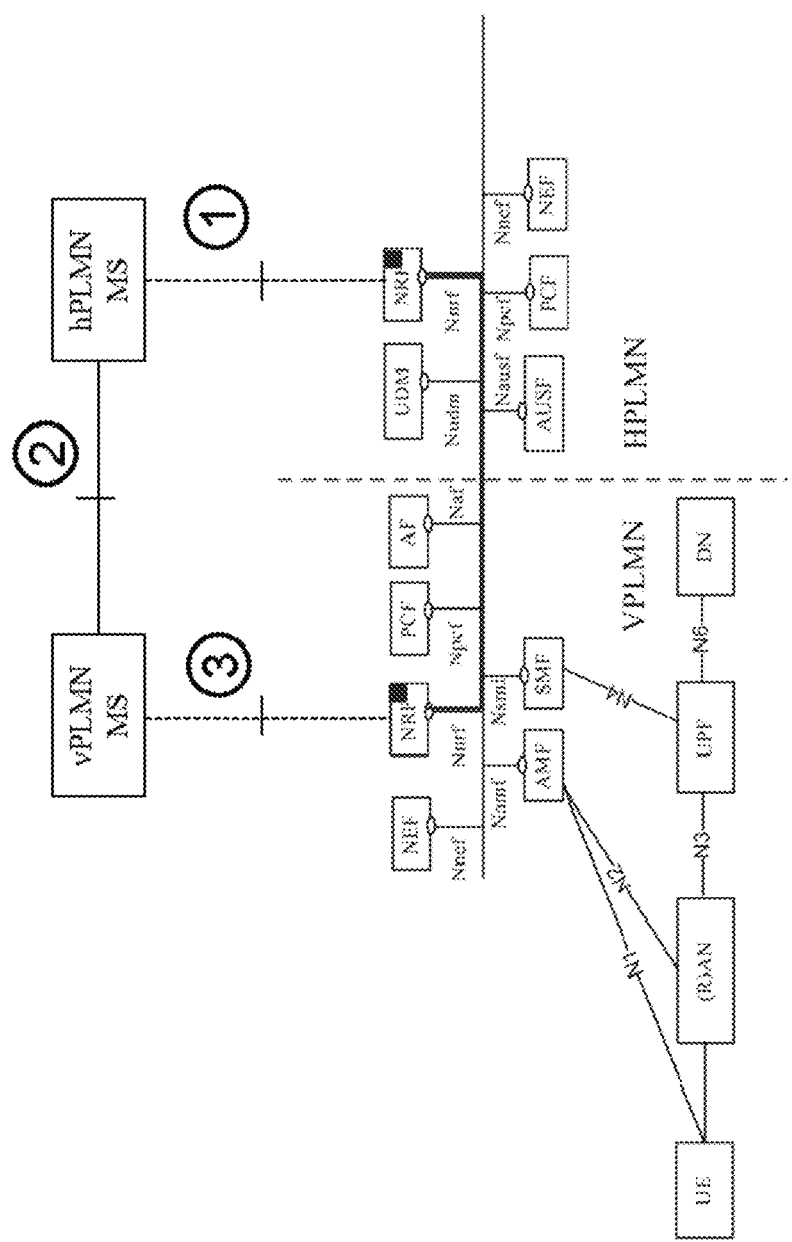
FIG. 8 shows a direct vNRF-to-hNRF connectivity within the roaming 5G system architecture of FIG. 2, according to an embodiment of the present invention.

Only for illustrative purposes, in the non-limitative case where the NF to be configured is the NRF, FIG. 8 shows a direct vNRF-to-hNRF connectivity within the roaming 5G system architecture of FIG. 2, according to an embodiment of the present invention.

Over the OP-OP interface (depicted by a numbered circle with the number "2"), the hPLMN MS may instruct the vPLMN MS to configure the vNRF (i.e., NRF in the VPLMN) corresponding to the hNRF (i.e., NRF in the HPLMN), by issuing to the vPLMN MS a roaming management request comprising configuration parameters. The requested configuration will consist in connecting the hNRF and the vNRF based on the following configuration parameters comprising at least one amongst a list of user identifications (e.g., UE IDs) for which the requested configuration is valid, a user group identification (e.g., a caller subscriber group ID) for which the requested configuration is valid, services and/or slices for which the requested configuration is valid, and an address of the hNRF in the HPLMN.

Once the roaming management request has been received over the OP-OP interface, the vPLMN MS may then locally configure the NRF (i.e., vNRF) based on the received configuration parameters. The internal configuration may be performed through any combination of delegation entity-to-SMF, delegation entity-to-NSW, delegation entity-to-NSSMF and delegation entity-to-IMF interfaces (depicted by the numbered circles with the numbers "1" for HPLMN and "3" for VPLMN). Again, the delegation entity may be separated from the management function entities or collocated with at least one management function entity.

Still for illustrative purposes, in the non-limitative case where the NF to be configured is the AMF, the hPLMN MS may instruct the vPLMN MS to configure the vAMF (i.e., AMF in the VPLMN) corresponding to the hAMF (i.e., AMF in the HPLMN) only for specific UE IDs and/or services, by forwarding the roaming management request directly to a respective NRF and/or SMF. For example, if a specific slice is only available in the HPLMN, then the AMF may directly access the corresponding SMF in the HPLMN (i.e., hSMF).

In a second embodiment, the present invention allows the hPLMN MS to interact with the vPLMN MS over the OP-OP interface, in order to instantiate a proxy NF in the VPLMN and to create a direct connectivity between the instantiated proxy NF in the VPLMN and the corresponding NF in the HPLMN, the proxy NF being instantiated by the vIMF.

Figure 9:
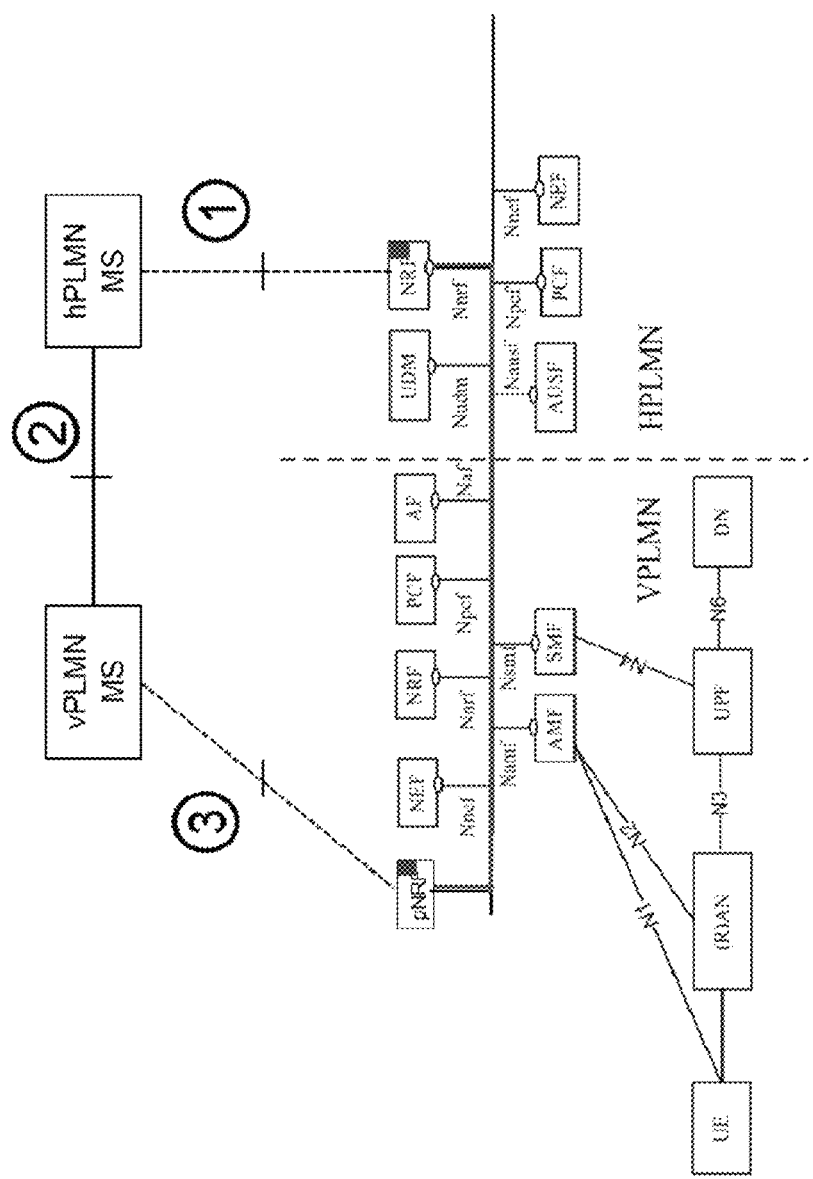
FIG. 9 shows a direct proxy vNRF-to-hNRF connectivity within the roaming 5G system architecture of FIG. 2, according to an embodiment of the present invention.

For illustrative purposes, in the non-limitative case where the instantiated proxy NF in the VPLMN is the proxy NRF (also denoted as proxy vNRF), FIG. 9 shows a direct proxy vNRF-to-hNRF connectivity within the roaming 5G system architecture of FIG. 2, according to an embodiment of the present invention.

Over the OP-OP interface (depicted by a numbered circle with the number "2"), the hPLMN MS may instruct the vPLMN MS to instantiate and configure, in the VPLMN, the proxy NRF (i.e., proxy vNRF, depicted as pNRF in the VPLMN) corresponding to the hNRF (i.e., NRF in the HPLMN), by issuing to the vPLMN MS a roaming management request comprising configuration parameters. The requested configuration will consist in connecting the hNRF and the pNRF based on the following configuration parameters comprising at least one amongst a list of user identifications (e.g., UE IDs) and services for which the requested configuration is valid, an address of the hNRF in the HPLMN, an image of the pNRF, instructions for onboarding and life cycle management, and instructions and parameters for performance management (PM), fault management (FM) and configuration management (CM) of the pNRF.

Once the roaming management request has been received over the OP-OP interface, the vPLMN MS may then locally instantiate and configure the pNRF based on the received configuration parameters. The internal configuration may be performed through any combination of delegation entity-to-SW, delegation entity-to-NSW, delegation entity-to-NSSMF and delegation entity-to-IMF interfaces (depicted by the numbered circles with the numbers "1" for HPLMN and "3" for VPLMN). Again, the delegation entity may be separated from the management function entities or collocated with at least one management function entity.

In a third embodiment, the present invention allows the hPLMN MS to interact with the vPLMN MS over the OP-OP interface, in order to embed an NF of the HPLMN (i.e., a hNF) into the VPLMN by instantiating the hNF directly in the VPLMN. The embedded hNF is managed (indirectly) by the hPLMN MS and interconnected with the NFs in the VPLMN in the same manner as an "ordinary" vNF. The vIMF instantiates, under the direct management of the hPLMN MS, the hNF to be embedded.

Figure 10:
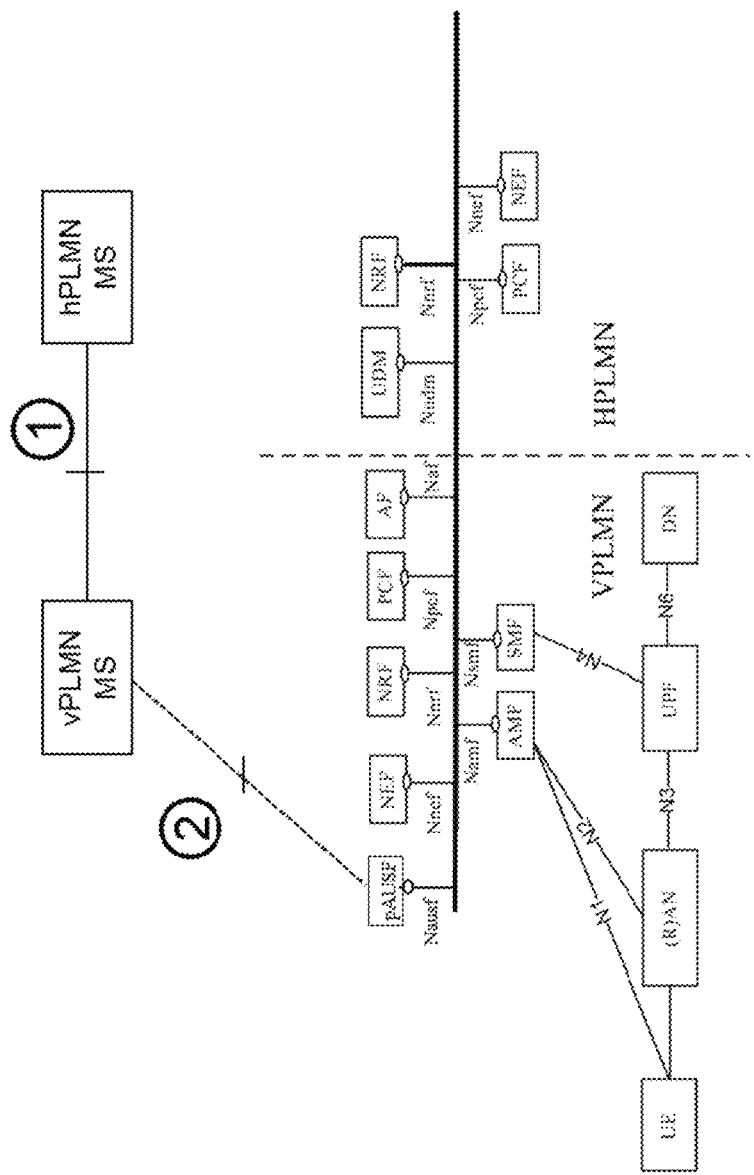
FIG. 10 shows a hAUSF (depicted as pAUSF) as embedded into the VPLMN within the roaming 5G system architecture of FIG. 2, according to an embodiment of the present invention.

For illustrative purposes, in the non-limitative case where the embedded hNF in the VPLMN is the hAUSF, FIG. 10 shows the hAUSF as embedded into the VPLMN within the roaming 5G system architecture of FIG. 2, according to an embodiment of the present invention.

Over the OP-OP interface (depicted by a numbered circle with the number "1"), the hPLMN MS may instruct the vPLMN MS to embed the hAUSF into the VPLMN and configure the embedded hAUSF, by issuing to the vPLMN MS a roaming management request comprising configuration parameters, which are similar to those of the second embodiment.

Once the roaming management request has been received over the OP-OP interface, the vPLMN MS may then locally instantiate and configure the hAUSF based on the received configuration parameters. The internal configuration may be performed through any combination of delegation entity-to-SMF, delegation entity-to-NSW, delegation entity-to-NSSMF and delegation entity-to-IMF interfaces (depicted by the numbered circle with the number "2" for VPLMN). Again, the delegation entity may be separated from the management function entities or collocated with at least one management function entity.

In a fourth embodiment, the present invention allows the hPLMN MS to interact with the vPLMN MS over the OP-OP interface, in order to embed an NF of the HPLMN (i.e., a hNF) into an NF of the VPLMN (i.e., a vNF) by instantiating the hNF directly in the vNF. The embedded hNF, which may be considered an agent of the corresponding hNF in the vNF, is managed (indirectly) by the hPLMN MS and interconnected with the NFs in the VPLMN in the same manner as an "ordinary" vNF. The vIMF instantiates, under the direct management of the hPLMN MS, the hNF to be embedded.

It shall be noted that the hNF to be embedded may be instantiated in the vNF as a part of this vNF if created from this vNF or, if otherwise created, as a separate entity with respect to this vNF.

Figure 11:
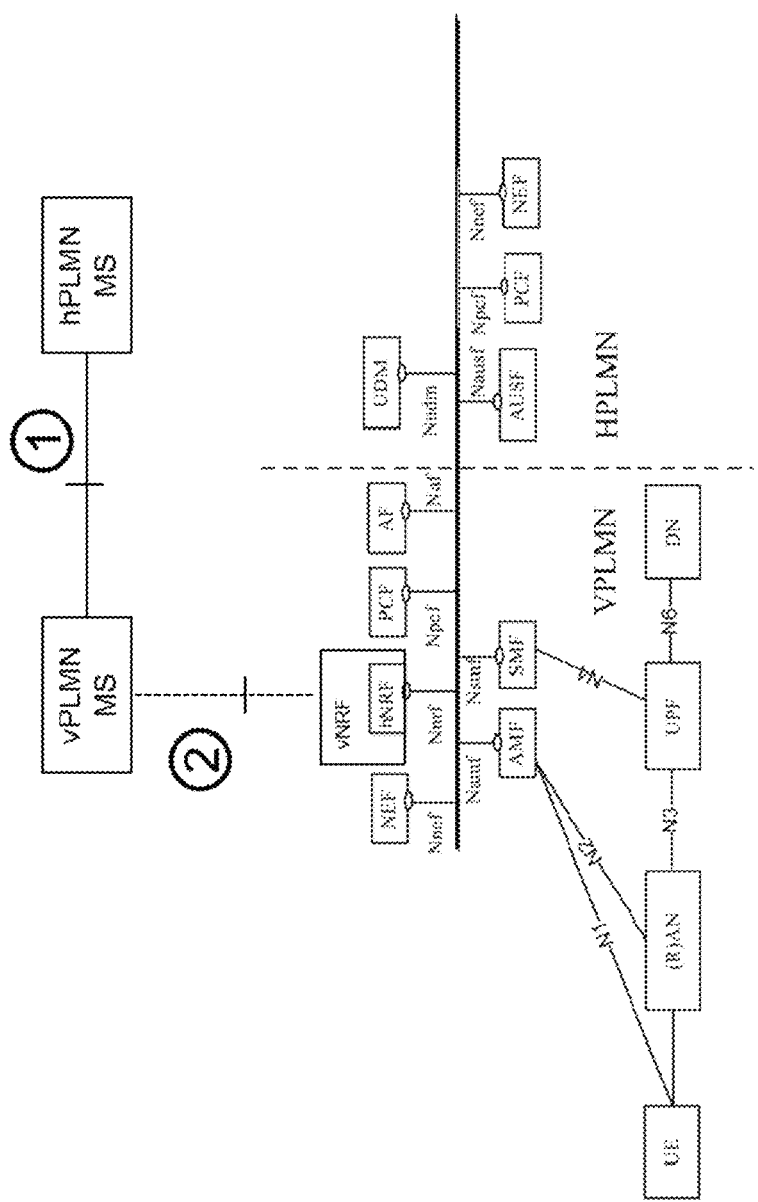
FIG. 11 shows a hNRF as embedded into the vNRF within the roaming 5G system architecture of FIG. 2, according to an embodiment of the present invention.

For illustrative purposes, in the non-limitative case where the embedded hNF in the VPLMN is the hNRF, FIG. 11 shows the hNRF as embedded into the vNRF within the roaming 5G system architecture of FIG. 2, according to an embodiment of the present invention.

Over the OP-OP interface (depicted by a numbered circle with the number "1"), the hPLMN MS may instruct the vPLMN MS to embed the hNRF into the vNRF and configure the embedded hNRF, by issuing to the vPLMN MS a roaming management request comprising configuration parameters, which are similar to those of the first embodiment.

Once the roaming management request has been received over the OP-OP interface, the vPLMN MS may then locally instantiate and configure the hNRF based on the received configuration parameters. The internal configuration may be performed through any combination of delegation entity-to-SW, delegation entity-to-NSW, delegation entity-to-NSSMF and delegation entity-to-IMF interfaces (depicted by the numbered circle with the number "2" for VPLMN). Again, the delegation entity may be separated from the management function entities or collocated with at least one management function entity.

It shall be noted that the vPLMN MS may restrict the HPLMN over the OP-OP interface to modify only the limited part of the vNRF that it is allowed to.

In return, the VPLMN exposes a direct management interface to the HPLMN to manage directly the hNRF embedded into the vNRF. The return over the OP-OP interface comprises at least one amongst the access credentials and the ID to access the hNRF embedded into the vNRF, the options to modify it or delete it, and the current entries in the hNRF.

It shall be noted that any combination of those first, second, third and fourth embodiments may be possible. In an exemplary combination, the HPLMN may configure the NRF in the VPLMN and, at the same time, configure the AMF in the VPLMN to connect directly to the SMF in the HPLMN for another service.

In summary, embodiments of the present invention relate to an OMS in a first administrative domain (e.g., HPLMN) for supporting a user roaming from the first administrative domain to a second administrative domain (e.g., VPLMN) within a network architecture. The network architecture comprises a collection of interconnected NFs deployed in a CP and a UP, and the interconnected NFs comprise at least core network control plane functions (CN-CPFs) and a core network user plane function (CN-UPF). The OMS in the first administrative domain is configured to generate and issue to an OMS in the second administrative domain, a roaming management request for roaming a user (e.g., UE) from the first administrative domain to the second administrative domain, over an inter-operator management interface (OP-OP interface), and configured to instruct the OMS in the second administrative domain to configure the second administrative domain based on the roaming management request to support the user roaming. In particular, the network architecture may be a roaming 5G system architecture as found in 3GPP TS 23.501, and the roaming solution of using the OP-OP interface to configure details of the user in the second administrative domain (e.g., VPLMN) within such a network architecture may be applied, for example, for users that frequently visit the second administrative domain (e.g., VPLMN), and/or when the number of HPLMN communicating with VPLMN is very large (i.e., exceeds a given threshold), and/or for slices in which the users require a very low delay.

While embodiments of the present invention have been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or operations, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although embodiments of the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An operator management system (OMS) in a first administrative domain for supporting a user roaming from the first administrative domain to a second administrative domain within a network architecture, the OMS in the first administrative domain comprising:
   at least one management function entity among a service management function (SMF) entity, a network slice management function (NSMF) entity, a network slice subnet management function (NSSMF) entity, and an infrastructure management function (IMF) entity; and
   at least one delegation entity configured to delegate a roaming management request to a corresponding management function entity of the OMS in the second administrative domain, wherein the OMS in the first administration domain is configured to:
      generate and issue to an OMS in the second administrative domain, the roaming management request for roaming a user from the first administrative domain to the second administrative domain, over an inter-operator management interface (OP-OP interface); and
      instruct the OMS in the second administrative domain to configure the second administrative domain based on the roaming management request to support the user roaming,
   wherein the network architecture comprises a collection of interconnected network functions (NFs) deployed in a control plane (CP) and a user plane (UP); and
   wherein the interconnected NFs comprise at least:
      core network control plane functions (CN-CPFs); and
      a core network user plane function (CN-UPF).

2. The OMS of claim 1,
wherein the management function entity is configured to manage a respective managed entity amongst a sub-service or service when the management function entity is the SMF, a network slice instance (NSI) or network slice when the management function entity is the NSMF, a network slice subnet instance (NSSI) or network slice subnet when the management function entity is the NSSMF and an infrastructure when the management function entity is the IMF, the infrastructure comprising network functions (NFs), virtualized network functions (VNFs), and basic resources;
wherein the delegation entity is configured to be an end-point of the OP-OP interface between the OMS in the first administrative domain and the OMS in the second administrative domain; and
wherein the roaming management request is provided by the OMS in the first administrative domain at a managed entity layer to the OMS in the second administrative domain at a corresponding managed entity layer, a delegation entity of the OMS in the second administrative domain receiving the roaming management request and delegating the roaming management request to a corresponding managed entity of the OMS in the second administrative domain.

3. The OMS of claim 2, wherein the roaming management request comprises at least one of configuration parameters or deployment parameters.

4. The OMS of claim 3, wherein the roaming management request is a request for configuring a first NF in the second administrative domain corresponding to a second NF in the first administrative domain, based on the configuration parameters in order to connect the first NF in the second administrative domain to the second NF in the first administrative domain.

5. The OMS of claim 3, wherein the roaming management request is a request for instantiating and configuring a third NF in the second administrative domain corresponding to a fourth NF in the first administrative domain, based on the configuration parameters in order to connect the third NF in the second administrative domain to the fourth NF in the first administrative domain.

6. The OMS of claim 3, wherein the roaming management request is a request for embedding a fifth NF of the first administrative domain into the second administrative domain by instantiating and configuring the fifth NF in the second administrative domain based on the configuration parameters in order to interconnect the embedded fifth NF with the NFs in the second administrative domain.

7. The OMS of claim 3, wherein the roaming management request is a request for embedding a sixth NF of the first administrative domain into a seventh NF in the second administrative domain by instantiating and configuring the sixth NF in the seventh NF, based on the configuration parameters.

8. The OMS of claim 3, which is further configured to:
   request a deployment, at the corresponding managed entity layer, of at least one managed entity in the OMS in the second administrative domain, the deployment being based on the deployment parameters; and
   request a configuration, at the corresponding managed entity layer, to the OMS in the second administrative domain, the configuration being based on the configuration parameters to use the deployed managed entity.

9. The OMS of claim 1, wherein the CN-CPFs comprise at least one of:
an access and mobility management function (AMF);
a session management function (SMF);
a policy control function (PCF);
a network exposure function (NEF);
a network repository function (NRF);
a unified data management (UDM);
an authentication server function (AUSF);
an application function (AF); or
a network slice selection function (NSSF).

10. An operator management system (OMS) in a third administrative domain for supporting a user roaming from a fourth administrative domain to the third administrative domain within a network architecture, the OMS in the third administrative domain comprising:
at least one management function entity among a service management function (SMF) entity, a network slice management function (NSMF) entity, a network slice subnet management function (NSSMF) entity, and an infrastructure management function (IMF) entity; and
at least one delegation entity configured to delegate a roaming management request to a corresponding management function entity of the OMS in the third administrative domain, wherein the OMS in the third administrative domain is configured to:
receive, from an OMS in the fourth administrative domain, the roaming management request for roaming a user from the fourth administrative domain to the third administrative domain, over an inter-operator management interface (OP-OP interface); and
configure the third administrative domain based on the received roaming management request to support the user roaming.

11. A system, comprising:
a first operator management system (OMS) in a first administrative domain for supporting a user roaming from the first administrative domain to a second administrative domain within a network architecture; and
a second operator management system (OMS) in the second administrative domain for supporting the user roaming;
wherein the first OMS and the second OMS communicate to each other over an inter-operator management interface (OP-OP interface); and
wherein the first OMS includes:
at least one management function entity among a service management function (SMF) entity, a network slice management function (NSMF) entity, a network slice subnet management function (NSSMF) entity, and an infrastructure management function (IMF) entity; and
at least one delegation entity configured to delegate a roaming management request to a corresponding management function entity of the OMS in the second administrative domain, and wherein the first OMS is configured to:
generate and issue to the second OMS, a roaming management request for roaming a user from the first administrative domain to the second administrative domain, over the inter-operator management interface (OP-OP interface); and
instruct the second OMS configure the second administrative domain based on the roaming management request to support the user roaming, wherein:
the network architecture comprises a collection of interconnected network functions (NFs) deployed in a control plane (CP) and a user plane (UP); and
the interconnected NFs comprise at least:
core network control plane functions (CN-CPFs); and
a core network user plane function (CN-UPF);
the second OMS being configured to:
receive, from the first OMS, the roaming management request for roaming the user from the first administrative domain to the second administrative domain, over the inter-operator management interface (OP-OP interface); and
configure the second administrative domain based on the received roaming management request to support the user roaming.

12. The system of claim 11, wherein:
the management function entity is configured to manage a respective managed entity amongst a sub-service or service when the management function entity is the SMF, a network slice instance (NSI) or network slice when the management function entity is the NSMF, a network slice subnet instance (NSSI) or network slice subnet when the management function entity is the NSSMF and an infrastructure when the management function entity is the IMF, the infrastructure comprising network functions (NFs), virtualized network functions (VNFs), and basic resources;
the delegation entity is configured to be an end-point of the OP-OP interface between the OMS in the first administrative domain and the OMS in the second administrative domain; and
the roaming management request is provided by the OMS in the first administrative domain at a managed entity layer to the OMS in the second administrative domain at a corresponding managed entity layer, a delegation entity of the OMS in the second administrative domain receiving the roaming management request and delegating the roaming management request to a corresponding managed entity of the OMS in the second administrative domain.

13. The system of claim 12, wherein the roaming management request comprises at least one of configuration parameters or deployment parameters.

14. The system of claim 13, wherein the roaming management request is a request for configuring a first NF in the second administrative domain corresponding to a second NF in the first administrative domain, based on the configuration parameters in order to connect the first NF in the second administrative domain to the second NF in the first administrative domain.

15. The system of claim 13, wherein the roaming management request is a request for instantiating and configuring a third NF in the second administrative domain corresponding to a fourth NF in the first administrative domain, based on the configuration parameters in order to connect the third NF in the second administrative domain to the fourth NF in the first administrative domain.

16. The system of claim 13, wherein the roaming management request is a request for embedding a fifth NF of the first administrative domain into the second administrative domain by instantiating and configuring the fifth NF in the second administrative domain based on the configuration parameters in order to interconnect the embedded fifth NF with the NFs in the second administrative domain.

17. The system of claim 13, wherein the roaming management request is a request for embedding a sixth NF of the first administrative domain into a seventh NF in the second administrative domain by instantiating and configuring the sixth NF in the seventh NF, based on the configuration parameters.

18. The system of claim 13, which is further configured to:
   request a deployment, at the corresponding managed entity layer, of at least one managed entity in the OMS in the second administrative domain, the deployment being based on the deployment parameters; and
   request a configuration, at the corresponding managed entity layer, to the OMS in the second administrative domain, the configuration being based on the configuration parameters to use the deployed managed entity.

\* \* \* \* \*